3,322,827
PROCESS FOR RENDERING UREA NON-CAKING
William M. James, Jr., Memphis, Tenn., assignor to W. R. Grace & Co., a corporation of Connecticut
Filed June 16, 1964, Ser. No. 375,553
1 Claim. (Cl. 260—555)

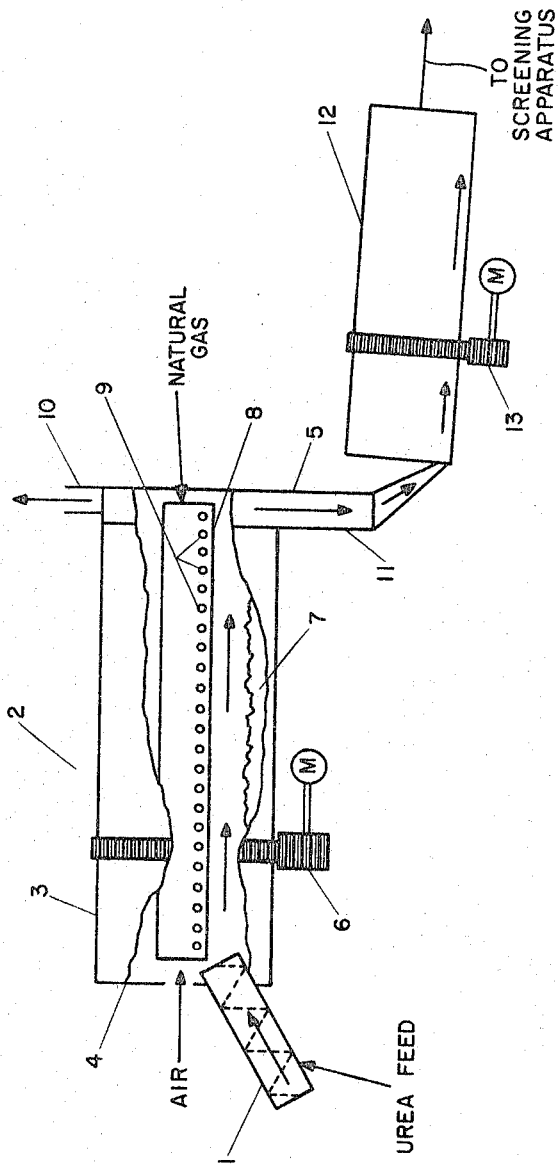

This invention relates to the treatment of urea. More particularly this invention relates to urea prills and micro prills having a greatly reduced tendency to cake.

In summary, this invention involves a process for rendering commercial grade unconditioned urea prills and micro prills, consisting of urea analyzing not more than about 0.35% moisture, by weight, and not more than about 2.0% biuret, by weight, substantially non-caking; said process comprising passing the urea through a high temperature zone, heated to a temperature greater than the melting point of urea, until the surfaces of said urea are incipiently fused as indicated by the sticky condition of said urea, withdrawing the urea particles from said zone before said particles are completely fused and while the mass temperature of said particles is about 93–127° C., cooling said particles to about 82° C., screening said cooled urea, thereby removing oversize particles and fines, recovering and bagging the resulting product consisting of urea analyzing not more than about 0.3% moisture, by weight, and not more than about 2.5% biuret, by weight.

In one preferred embodiment of this invention, the process is operated as a continuous method for rendering commercial grade unconditioned urea prills and micro prills consisting of urea analyzing not more than about 0.3% moisture, by weight, and not more than about 2.0% biuret, by weight, substantially non-caking, said process comprising continuously feeding said urea into a first agitating device, retaining a mass of said urea in said device and continuously agitating said mass while positioning a high temperature zone in said device whereby the thus agitated mass of urea in heated and substantially all individual urea particles are passed through said zone, thereby incipiently fusing the surfaces of said particles as indicated by the sticky condition of said particles, continuously withdrawing urea particles from said first agitating device before said urea is completely fused and while the mass temperature of the urea particles in the first agitation device is about 93–127° C., transferring said urea to a second agitating device, continuing to agitate said prills in said second device until said prills are cooled to a temperature below about 82° C., continuously removing the thus cooled urea from said device, continuously screening said cooled urea, thereby removing oversize particles and fines, and bagging the resulting product consisting of urea analyzing not more than about 0.2% moisture, by weight, and not more than about 2.5% biuret, by weight.

In another preferred embodiment the high temperature zone is a flame so oriented that said flame is in contact with the agitated mass of urea particles, whereby substantially all individual urea particles are contacted by said flame.

In another embodiment, the urea treated is commercial grade urea prills and micro prills consisting of urea analyzing not more than 0.20% moisture, by weight, and not more than 1.2% biuret, by weight.

In another embodiment, the mass temperature of the urea particles in the first agitating device is below about 110° C.

In still another embodiment the product consists of urea analyzing not more than about 0.15% moisture, by weight, and 1.4% biuret, by weight.

In the drawing: The drawing is a flow diagram of the process of this invention.

Regular, or ordinary, urea prills are shot-like particles of urea prepared by dropping molten urea, from sprayers, downward through a high tower. Urea micro prills are shot-like particles of urea with smaller diameters than regular urea prills. The average particle diameter of ordinary urea prills is about 1400–2200 microns while that of micro prills is about 500–750 microns.

Many substances both organic and inorganic when in powdered, crystalling, granular, or prill form have a great tendency to cake and form more or less solid masses when stored for any significant period of time. Hence, the ultimate consumer usually must crush or break up these masses before they can be used for their intended purposes. For example, the caking tendencies of various fertilizer materials necessitate the expenditure of much time and labor in order to render these materials suitable for even distribution on the area to be fertilized and also eliminate, or at least greatly reduce, the clogging and jamming of the distributing machinery. Prilled urea, also known as urea prills, and urea micro prills are particularly susceptible to the difficulties mentioned.

In order to prevent the caking of said urea, it is customary to treat said urea with appreciable quantities, e.g., up to about 4% or more, by weight, of an anti-caking material such as clay, talc, gypsum, or the like. This has the objection of placing a substantially insoluble material in the urea, and also creating a dust problem when the urea is handled, because the anti-caking additive is usually in the form of a very fine powder.

When urea bags are stored, pressures of 1 to about 5 lbs. per square inch are frequently encountered on the bags, especially those near the bottom of a pile. This pressure increases the caking tendency of the urea with the result that in some cases the bags set up into substantially hard cakes.

It is an object of this invention to provide a method for treating urea prills and micro prills to reduce the tendency of said urea to cake. It is a further object of this invention to provide urea prills and micro prills with a substantially reduced tendency to cake. It is still a further object of this invention to provide a process for preparing substantially non-caking urea prills and micro prills which are free of added impurities (the so-called anti-caking agents). Other objects of this invention will be readily apparents to those skilled in the art in view of the more detailed disclosure which follows.

This invention is based upon the discovery that the tendency of urea prills and micro prills to cake when stored is greately reduced by passing said urea through a high temperature zone maintained at a temperature higher than about the melting point of urea (about 133° C.), withdrawing the urea particles from said high temperature zone before said particles become completely fused, cooling said particles to below about 82° C., removing the fines and oversize particles, recovering and bagging the thus treated urea. The substantially non-caking urea produced by this process is useful in all of the applications where urea prills and micro prills are ordinarily used. This includes agricultural and industrial applications.

The actual temperature of the high temperature zone through which the urea particles are passed is not critical. The high temperature zone may comprise an externally heated furnace, a simple flame front, or any other heated zone. This can be accomplished in a wide variety of manners, for example: agitating a mass of urea prills or micro prills in a heated furnace; permitting a dispersed stream of said urea to fall through a high temperature flame; conveying a mass of said urea in a bed substantially one prill or one micro prill thick past a radiant heater, under a flame, or through a heated furnace; or by other means which will be readily apparent to those skilled in the art.

In the process of this invention, the urea prills or micro prills are exposed to a high temperature zone for a time insufficient to completely melt the individual urea particles. No specific time range can be specified, since time depends upon the particular mode of treatment. When the temperature of a high temperature zone is very high (e.g., when the zone is a flame front) and the urea particles are passed through the zone as a dispersed stream, significant improvement in the anti-caking properties are obtained almost instantaneously, in other words, with a single pass through the high temperature zone. When a large mass of urea is used, e.g., in a rotary furnace, longer exposure times (on the order of about 0.2–1.5 hours) are required before substantially all of the individual urea particles are exposed to the high temperature. In all instances it is required that the urea particles be withdrawn from the high temperature zone before complete fusion of the mass occurs. In some instances, incipient fusion of the surfaces of some of the individual particles may occur, and occasionally some agglomeration results from contact between temporarily softened urea particles, thereby forming some oversize particles which are removed by screening before bagging the treated product. In the case of ordinary, or regular, urea prills (average particle diameter, ca. 1400–2200 microns), oversize particles are those particles retained on a 4 mesh, U.S. Standard screen. When applying the process to urea micro prills (average particle diameter, ca. 500–750 microns) oversize particles are those particles retained on about a 12 mesh, U.S. Standard screen. In all instances when urea prills or urea micro prills were exposed to high temperature zones, a portion of said prills or micro prills was broken down with the resulting formation of fines, or fine particles. In the case of regular prills, fines are those particles which will pass through about a 20 mesh, U.S. Standard screen. In the case of regular prills, any screen larger than 20 mesh, U.S. Standard, and smaller than 4 mesh, U.S. Standard, can be used to remove said fines, because particles retained on, for example, a 10 mesh, 16 mesh, or 18 mesh, U.S. Standard screen would also be retained on a 20 mesh, U.S. Standard screen. The critical limitation, when applying the process to ordinary urea prills, is the removal of substantially all particles passing through about a 20 mesh, U.S. Standard screen. When applying said process to urea micro prills fines are those particles which will pass through about a 40 mesh, U.S. Standard screen. Any screen larger than about 40 mesh U.S. Standard, and smaller than about 12 mesh, U.S. Standard can be used to remove fines from treated urea micro prills. Particles larger than about 12 mesh, U.S. Standard, are usually considered too large to classify as micro prills. Hence, when applying the process of this invention to urea micro prills, particles retained on about a 12 mesh, U.S. Standard screen are classified as oversize particles. Economic reasons, rather than technical reasons, favor the selection of 20 and 40 mesh screens, rather than coarser screens, for removing fines from urea prills and urea micro prills, respectively, treated according to the process of this invention previous to bagging the thus treated urea. The percentage of fines produced was a function of temperature and this conversion of urea prills and urea micro prills to fine particles became excessive (above about 6%, by weight) when the temperature of the mass of the prills exceeded about 110° C. In all instances it was necessary to screen out the aforesaid fine particles in order to obtain prills or micro prills with substantially reduced caking tendencies. Failure to screen out the fine particles actually increased the caking tendency of treated prills and micro prills. This was a surprising and completely unexpected discovery because no such phenomenon had been encountered in the treating of urea crystals. The thus treated urea particles are removed from the high temperature zone and cooled to a temperature below about 82° C. before bagging. It is essential that the treated urea be cooled below about 82° C. before bagging, because the caking tendency of treated prills and micro prills bagged above about 82° C. is not substantially less than that of untreated prills. In actual practice, I have found that the caking tendency of both ordinary urea prills and micro urea prills is often increased, rather than decreased, when the treated urea, after removing fines, is bagged at temperatures above about 82° C. Heat treated urea prills and micro prills with mass temperatures up to about 93–127° C. have been cooled to above 82° C., screened, bagged, and stored without any noticeable decrease in the anti-caking properties which resulted from the process of this invention; however, the formation of fine particles became excessive above about 110° C., and the caking tendency of urea prills is not substantially reduced when the treated prills are bagged at temperatures above about 82° C.

Numerous means can be used for carrying out the process of this invention. Urea prills or micro prills can be placed on an endless conveyor belt and passed through a high temperature furnace or past a source of radiant heat. Anti-caking urea prills and micro prills have been obtained by gravity feeding a stream of said urea through a vertical tubular furnace and by dropping said urea through a tube having a Bunsen type of flame front maintained at the discharge end. As stated supra, the flame or heat treatment of urea prills and micro prills does not substantially reduce the caking tendency of said urea unless the fines are screened out before bagging the heat treated urea. Substantially non-caking urea prills and micro prills have been obtained by feeding the mass of said urea to a rotary mixing drum, introducing a flame in the center of the drum, rotating the drum to lift said urea and drop the thus lifted urea through the flame, removing the flame after substantially all the individual urea particles have been exposed thereto, cooling the flame treated urea, screening to remove oversize and fine particles, recovering, and bagging the thus treated urea. Instead of a rotating drum, various other devices such as ribbon blenders, paddle mixers, cement mixers, and the like, can be used. It is also feasible to heat the interior of the mixing device indirectly rather than by the direct introduction of a flame into the interior of said device.

The cooling device used in the process of this invention can be a rotary cooler, a cooler through which the heat-treated urea passes on an endless belt or the like. Cooling may be accomplished by passing cool air over said urea or by dropping the heat-treated urea through a tower counter current to a stream of air, suitably at ambient temperature. Other cooling devices suitable for use in the process of this invention will be readily apparent to those skilled in the art.

The cooled urea particles can be screened with vibrating screens, shaking screens, trommels, and the like before bagging.

The process of this invention can be conducted in a batchwise or continuous manner, as desired. Obviously, the gravity feed apparatus and the endless belt conveyor discussed above are each readily adapted to continuous operation, and still other means for continuous operation will be readily apparent to those skilled in the art.

The present invention is illustrated further by the following examples which are illustrative only and which are not intended to limit the scope of this invention. All mesh sizes refer to U.S. Standard screens and all analyses in said examples are expressed in percent by weight.

EXAMPLE I

The figure is a flow diagram of the apparatus used in this example.

Urea, in the form of prills analyzing about 1.2% biuret, about 0.3% moisture, passing a 4 mesh screen, retained on a 20 mesh screen, and having an average particle diameter of about 1700 microns, was supplied continuously to screw conveyor 1, the speed of which was set to regulate the rate that said urea was fed into the treater, or treating zone, showing generally at 2. Said urea was fed at about 950 lbs. per hour. Said zone consisted of hollow steel cylinder 3 having a shell, with entrance end 4, and an exit end 5. Said cylinder was mounted on rollers (not shown) and provided with rotating means, shown generally at 6, so that the cylinder could be rotated at a constant speed (e.g., ca. 6–10 revolutions per minute). The treating zone was tilted sufficiently to cause the urea to move gradually toward the exit end 5 of said zone. Mounted inside the treater shell were horizontal lifting flights (not shown) which lifted the urea from a urea bed 7 in the bottom section of the treater as the treater rotated and allowed the thus lifted urea to fall back into said bed. A horizontal gas burner, substantially the full length of the treater, having air and gas regulating means (not shown) was mounted inside the treater about half way between the central axis and the shell. Said burner was not attached to the treater shell. The burner was fed a mixture of natural gas and air which burned as it issued from multiple closely spaced ports 9. This arrangement provided a linear flame front along a substantial portion of the treater's length. The lifting flights and burner were arranged so that a substantial portion of the urea lifted by said flights fell back through the flame (not shown). The use of an internal baffle (not shown) to deflect falling urea into the flame enhanced this effect. Products of combustion were removed via vent 10, and the urea was cooled continuously by a large excess of secondary air, entering the treater at 4, which was pulled through the system by an exhaust fan (not shown). As shown in the flow diagram, the air flow is concurrent with the urea flow, but the system can be arranged to provide counter current flow. Heat was also removed by passing a cooling medium (e.g., water) over the shell of the treater and through jackets (not shown) on the burner and deflecting baffle. This was important, because maintaining the surfaces of the treater shell and baffle cool prevented the accumulation of a crust of urea on the lifting flights.

The depth of the urea bed in the treater was regulated by the height of a ring dam (not shown) at the discharge end of the treater. The apparatus was operated so that the urea moved through the unit, falling repeatedly through the flame and back into the urea bed, thereby maintaining a maximum bed temperature of about 121° C. at the discharge end of said bed. Momentarily temperatures on the surfaces of many urea particles were high enough to incipiently fuse the surfaces of said particles (melting point, ca. 133° C.) as said particles fell through the flame. Product left the treater through chute 11 which was fitted with an air lock (not shown) and passed into a cooler 12 of standard design, provided with rotating means shown generally at 13, where the heat treated urea particles were cooled to about 82° C. The cooled product was screened in a screening apparatus of standard design (not shown). A small quantity (less than about 1%, by weight) of material retained on a 4 mesh screen was obtained and about 15%, by weight, of the product passed through a 20 mesh, U.S. Standard, screen. The material retained on the 4 mesh screen and that passing the 20 mesh screen were set aside. Material which was set aside was suitable for use in preparing fertilizer solutions or for making glue or resin. Material passing the 4 mesh screen and retained on the 20 mesh screen was bagged at about 82° C. A portion of this material was analyzed; it was found to contain 0.15% moisture, and 1.4% biuret. Several bags selected at random, of the minus 4, plus 20 mesh product were selected for testing to determine the caking tendency of the treated prills. The warehouse stack test was used for this purpose, because said test substantially approaches actual field storage conditions. In this test, the product to be tested is bagged (ca., 100 lbs. of urea to the bag), and the test bags are placed horizontally on a wooden pallet of the type normally used for commercial warehouse storage. The same type of bag is employed as in routine commercial production of the product under test. The bag is filled to the same net product weight (ca. 100 lbs.), and the same bag closure used as is used commercially.

The test bags are arranged on the pallet in layers of four bags each, one bag along each side of the pallet. If there is an insufficient number of test bags to complete a layer on the pallet, additional bags of routine product are added as ballast. Six layers of bags are placed on the pallet.

The pallet of test material is then placed in warehouse storage, and weight is added by stacking two full pallets of commercially bagged product (6×4=24 bags/pallet) on top of it. The test pallet is stored in this condition for 28 days. At the end of the 28 days' storage period, the test bags are carefully removed from the pallet and each is dropped once from a height of about 2 feet to separate any loosely held agglomeration of particles that may have formed during storage. Each bag is opened at one end, and its content is poured onto a 2 mesh screen which retains any lumps of caked material that may have formed. The lumps are retrieved and weighed. The weight, in pounds, of cake retained on the 2 mesh screen constitutes a quantitative measure of the urea's caking tendency.

At the end of the 28 day stacking period, about 0.2–0.4 lb. (average 0.3 lb.) of urea from each of five 100 lb. bags was retained on a 2 mesh screen.

A 500 lb. lot of urea prills that had been subjected to the above-described flame treatment and freed of +4 mesh material, but not freed of −20 mesh material was cooled to about 82° C. and bagged (ca. 100 lbs. to the bag). The bagged material was subjected to the aforesaid stack test. At the end of the 28 day stacking period, about 30.9–31.1 lb. (average 31 lb.) of material was retained on a 2 mesh screen. This result shows that it is essential that the fine (−20 mesh) particles be removed from the product before bagging, because the caking tendency of the treated urea is substantially increased if the fine particles are not removed.

As a control, five 100 lb. bags of untreated urea prills from the same lot used in the above-described treatment were also subjected to the stacking test. In this instance, about 6.8–7.0 lbs. (average 6.9 lbs.) of material from each bag was retained on a 2 mesh screen. This result shows that the above-described treatment substantially reduced the caking tendency of urea prills.

EXAMPLE II

The general procedure of Example I was repeated but in this instance the urea feed rate was about 980 lb. per hour, the temperature of product leaving the treater was about 110° C., and the bagging temperature was about 76° C. The urea prills used as feedstock analyzed about 0.15% moisture, 1.6% biuret, and had an average particle diameter of about 1700 microns; the product analyzed about 0.1% moisture, 1.7% biuret, and about 3.3% fines (minus 20 mesh).

Screened flame-treated product (passing a 4 mesh screen and retained on a 20 mesh screen) and untreated feedstock, from the same lot of prills, were both subjected to the stack test described in Example I. In the instance of the treated product, only an average of 0.6 lb. per 100 lb. bag of material was retained on a 2 mesh screen. In contrast to this, an average of 8.2 lbs. per 100 lb. bag of untreated feedstock was retained on said 2 mesh screen.

EXAMPLE III

The general procedure of Example I was repeated, but in this instance urea feed rate was about 995 lbs. per hour and the bagging temperature was about 92° C. The prills used as feedstock analyzed about 0.3% moisture, 1.4% biuret, and had an average particle diameter of about 1700 microns; the product analyzed about 0.1% moisture and 1.9% biuret. About 21% of the product consisted of fines (−20 mesh particles).

Screened flame-treated product (passing a 4 mesh screen and retained on a 20 mesh screen) and untreated feedstock, from the same lot of prills, were both subjected to the stack test described in Example I. In the instance of the treated product, an average of 33 lbs. per 100 lb. bag of material was retained on a 2 mesh screen, while an average of 29 lbs. per 100 lb. bag of untreated feedstock was retained in said 2 mesh screen.

Results of Example III show that the caking tendency of urea prills was not reduced when the prills were treated and screened according to the process of my invention but bagged at about 92° C., a bagging temperature higher than that claimed.

I have also found that the caking tendency of urea micro prills is substantially reduced when said micro prills are treated and screened according to the process of my invention and bagged at temperatures below about 82° C. When said micro prills are treated and screened according to the process of my invention, but bagged at temperatures above about 82° C., the caking tendency of the thus treated micro prills is not substantially reduced.

What is claimed is:

Continuous process for rendering commercial grade unconditioned urea prills and micro prills consisting of urea analyzing not more than about 0.35% moisture, by weight, and not more than about 2.0% biuret, by weight, substantially non-caking, said process comprising continuously feeding said urea into a first agitating device, retaining a mass of said urea in said device and continuously agitating said mass while positioning a high temperature zone in said device whereby the thus agitated mass of urea is heated and substantially all individual urea particles are passed through said zone, thereby incipiently fusing the surfaces of said particles as indicated by the sticky condition of said particles, continuously withdrawing urea particles from said first agitating device before said urea is completely fused and while the mass temperature of the urea particles in the first agitating device is about 93–127° C., transferring said urea to a second agitating device, continuing to agitate said prills in said second device until said prills are cooled to a temperature below about 82° C., continuously removing the thus cooled urea from said device, continuously screening said cooled urea, thereby removing oversize particles and fines, and bagging the resulting product consisting of urea analyzing not more than about 0.3% moisture, by weight, and not more than about 2.5% biuret, by weight, said product being bagged at a temperature below about 82° C.

References Cited

UNITED STATES PATENTS 3,123,637    3/1964    Lard et al. _____ 260—555

OTHER REFERENCES

Bland, Petroleum Processing, October 1952, pp. 1457–60.

Ludwig, Chemical Engineering (January 1954), pp. 156–59.

Silverberg et al., Agricultural and Food Chemistry, vol. 6, No. 6 (June 1958).

ALEX MAZEL, *Primary Examiner.*

HENRY R. JILES, *Examiner.*